United States Patent

Janis

[15] 3,662,382

[45] May 9, 1972

[54] KEYBOARD CONTROLLED ELECTRICAL CODE-SIGNAL GENERATOR SYSTEM

[72] Inventor: Irwin R. Janis, Howard Beach, N.Y.

[73] Assignee: Fairchild Camera and Instrument Corporation

[22] Filed: Nov. 9, 1970

[21] Appl. No.: 87,987

[52] U.S. Cl. ..............................340/365, 178/17 R, 178/81, 197/107, 101/93 C, 178/26

[51] Int. Cl. ..........................................................G08c 1/00

[58] Field of Search ................340/365; 179/90 K; 178/17 R, 178/17 C, 17.5, 79, 81, 26 R, 26 A; 235/145, 146, 27; 197/98, 49, 107; 101/93 MN

[56] References Cited

UNITED STATES PATENTS

| | | | |
|---|---|---|---|
| 3,454,717 | 7/1969 | Peters | 340/365 |
| 3,239,608 | 3/1966 | Jones, Jr. | 178/17 |

*Primary Examiner*—John W. Caldwell
*Assistant Examiner*—Robert J. Mooney
*Attorney*—Laurence B. Dodds

[57] ABSTRACT

An electrical code-signal generator system for operation from a keyboard having a plurality of pulse generating keys comprises a plurality of input lines for individually receiving pulses from the keys, a normally enabled gate in each of the input lines, a code generator having a plurality of input circuits individually coupled to the gates and having a first plurality of data output lines on which appear character-representative encoded signal pulses. The generator system further comprises a first shift register coupled to the data output lines, a second shift register coupled to the first shift register and having a second plurality of data output lines and a plurality of AND gates individually included therein, and a punch and connected driving motor which develops a cyclical signal representative of and isochronous with its operating cycle. The generator system further includes an OR gate responsive to the first signal occuring on the first data output lines for developing a clock pulse commencing a predetermined interval thereafter and a circuit for applying the clock pulses to the first register for transferring data from the code generator to the output of the first register and thence to the input of the second register, a sync-logic unit jointly responsive to the clock pulses and to the cyclical signal for enabling the AND gates included in the second data lines for transferring data from the AND gates to the punch and for inhibiting all of the gates in the input lines for a minimum interval, of the order of 1 $\mu$sec, after actuation of a given key and until any data in the second shift register has been utilized by the punch.

5 Claims, 5 Drawing Figures

KEYBOARD CONTROLLED ELECTRICAL CODE-SIGNAL GENERATOR SYSTEM

BACKGROUND OF THE INVENTION

This invention relates to keyboard controlled electrical code-signal generator systems and is of general application as an interface between a keyboard, each key of which when actuated develops an electrical signal, and an utilization device, for example a tape punch, a magnetic tape recorder, a phototypesetting machine, or a computer, but it will be specifically described as a component of a system including a typewriter in association with a tape punch.

In systems of the type described, signals from the keyboard generally are applied to an encoding matrix or equivalent for deriving from the key-generated signals a parallel multidigit pulse code unique to each key and of a language for which the utilization device is designed. For example, a standard typewriter usually has about 50–60 keys which include, in addition to the character keys, those for various control functions. Such 60-key signals can be represented by a seven-bit or seven-level permutation code and it may be desirable to provide an additional bit or level for control, checking, or the like.

One problem that has arisen in the design of such systems is the possibility that two keys may be actuated essentially simultaneously in a way that their respective code pulses are combined in the code generator. To avoid this, it has been the practice to provide an interlock so that a second key could not be actuated until the first key had returned to an inactive position. Due to the appreciable time cycle involved in the manual actuation of a key, its release, and return to an inactive position, the speed of operation of such a system is undesirably limited.

Another problem encountered in systems of the type described is that of changing the language of the code generator to adapt it to the languages of different utilization devices. In prior systems of the type described, the change of language could be achieved only by changing the entire keyboard or by changing the entire interlocking circuitry as well as the code generator.

It is an object of the invention, therefore, to provide a new and improved keyboard controlled electrical code-signal generator system which effectively obviates one or both of the above-noted limitations of prior devices of the type described.

It is another object of the invention to provide a new and improved keyboard controlled electrical code-signal generator system in which a second key may be depressed and its signal sensed essentially independently of the first key depression, thus materially increasing the speed of operation of the system.

It is a further object of the invention to provide a new and improved keyboard controlled electrical code-signal generator system in which the language of the code generator may be changed merely by changing the encoding matrix or equivalent without altering other components of the system.

SUMMARY OF THE INVENTION

An electrical code-signal generator system for operation from a keyboard having a plurality of signal-generating keys comprises a plurality of input lines for individually receiving signals from the keys, a normally enabled gate in each of the input lines, and a code generator including a plurality of input circuits individually coupled to such gates, having a first plurality of data output lines, and effective to develop character-representative encoded signal pulses on the data output lines, a first shift register coupled to the data output lines, and a second shift register coupled to the first shift register and having a second plurality of data output lines. The code-signal generator further comprises a cyclically operating utilization device coupled to the second data output lines and effective to develop a cyclical signal representative of and isochronous with its operating cycle, a source of clock pulses, means responsive to the clock pulses for transferring data from the code generator to the output of the first register and thence to the input of the second register, and means coupled to the source and to the utilization device and jointly responsive to the clock pulses and to the cyclical signal for developing a control signal and applying it to all of the input line gates to inhibit the same for a predetermined minimum interval after actuation of a given key and until any data in the second shift register has been utilized by the utilization device.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENT

Figure 1:
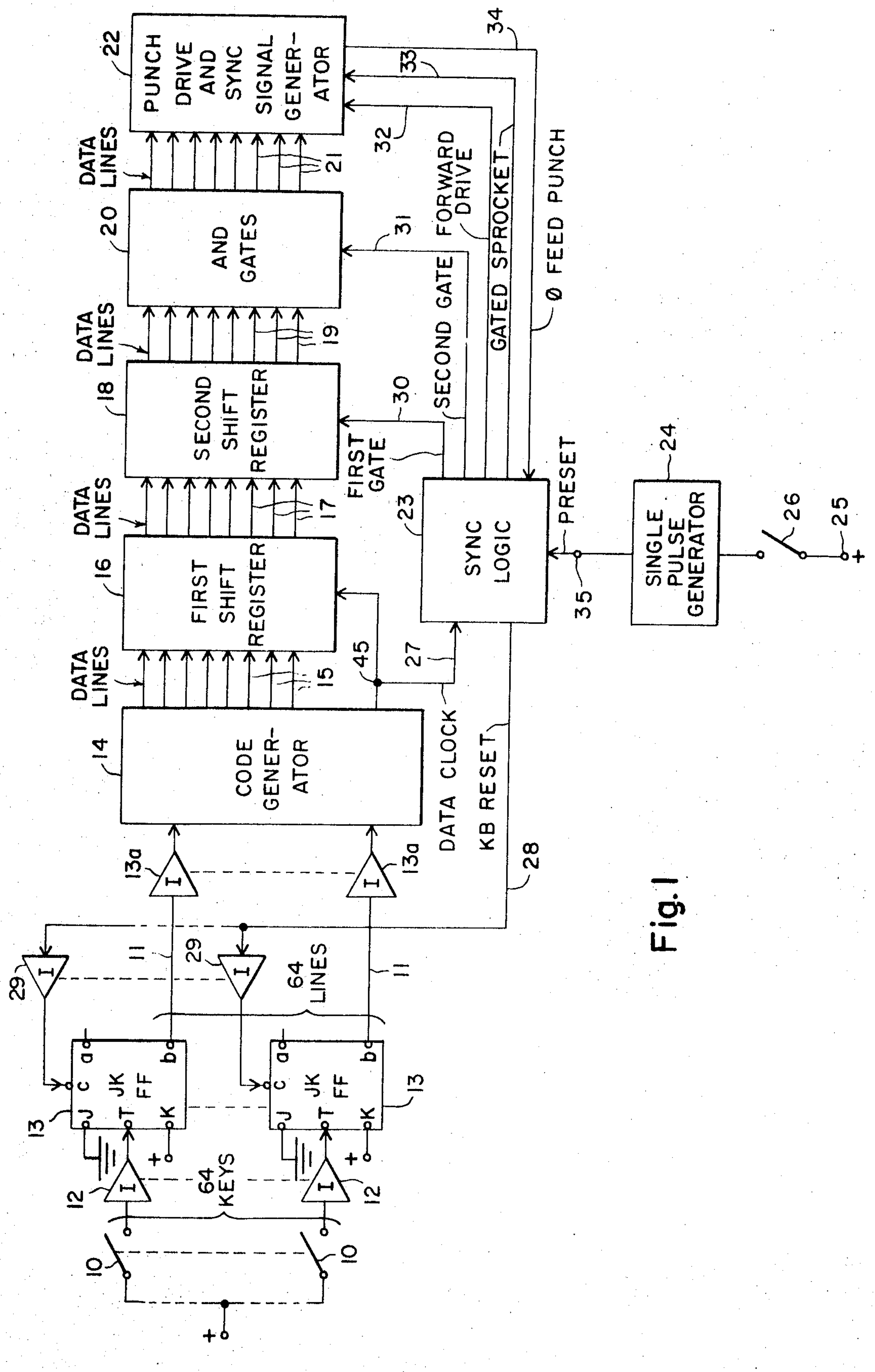
FIG. 1 is a schematic block diagram of an overall keyboard controlled electrical code-signal generator system embodying the invention.

Referring now to FIG. 1 of the drawings, there is represented schematically an electrical code-signal generating system for operation from a keyboard having a plurality, specifically 64, of signal-generating keys 10 and an equal plurality of input lines 11 for individually receiving signals from the keys. Included in each of the input lines from the keys 10 is an inverter 12 and a normally enabled gate 13 shown as of the JK flip-flop type, the logic of which is described hereinafter. Each of the units 13 may be one-half of a Type 9094 Dual JK Flip-Flop, commercially available from Fairchild Camera and Instrument Corporation, Mountain View, California. As indicated, the J terminal of each of the units is grounded while the K terminal is connected to a positive source and the trigger terminal T is connected to the associated inverter 12. The output terminal *b* is connected to the input lines 11 while the output terminal *a* is not used.

Figure 2:
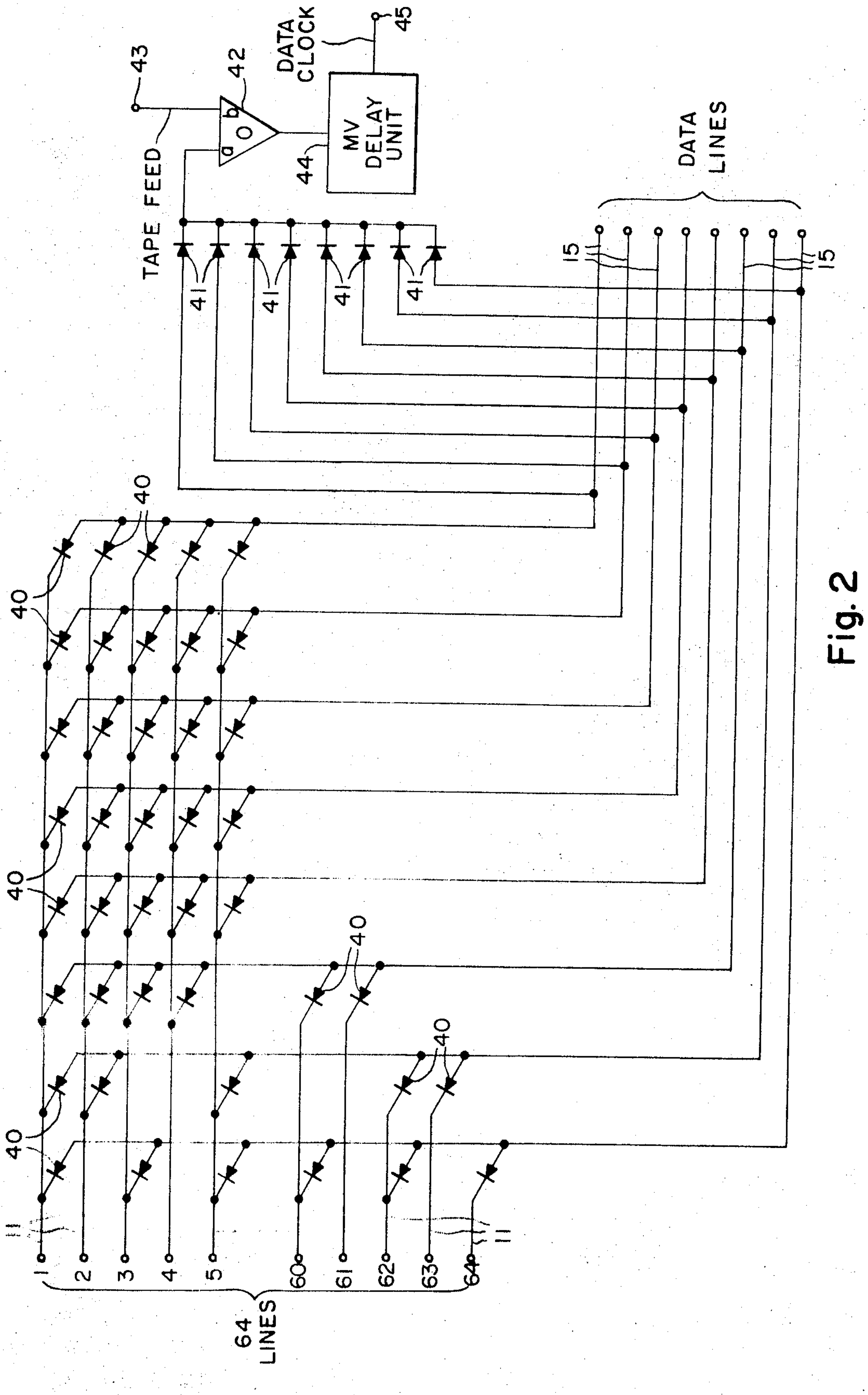
FIG. 2 is a schematic diagram of the code-generating unit of FIG. 1.

The code-signal generator system of FIG. 1 further comprises a code-generator unit 14, shown schematically in FIG. 2, having a plurality of input circuits individually coupled to terminals *b* of gates 13 through inverters 13*a*. The unit 14 also has a plurality of data output lines, specifically eight data output lines 15 coupled to a first shift register 16, which may be of conventional construction, having eight data output lines 17 coupled to a second shift register 18, in turn having eight data output lines 19 coupled to a series of AND gates 20 having eight data output lines 21 coupled to a cyclically operating utilization device such as a punch drive and sync-generator unit 22. The functioning and interaction of the units so far described are controlled by a sync-logic unit 23, described hereinafter, the operation of which is initiated by a signal from a single pulse generator 24 connected to a supply terminal 25 through a manually operable switch 26. The sync-logic unit 23 also receives a data clock signal over a line 27 from an output of code generator 14. This data clock signal is also connected to the first shift register 16 to control the transfer of data therefrom to the second shift register. The sync-logic unit 23 further receives a synchronizing signal $\phi$ Feed Punch from the unit 22 over lead 34.

The sync-logic unit 23 generates a number of control signals:

1. A KB (keyboard) Reset signal which is applied over line 28 and a series of inverters 29 to the *c* input terminal of each of the JK units 13.

2. A First Gate signal applied over line 30 to the second shift register to control the transfer of data therein to the AND gates 20.

3. A Second Gate signal applied over line 31 to the AND gates 20 to control the transfer of data therefrom to the punch drive unit 22.

4. A Forward-Drive signal transferred over line 32 to control the punch in unit 22.

5. A Gated Sprocket signal transferred over lead 33 to control the punching of sprocket holes in the tape to permit it to be drawn through the punch.

Figure 3:
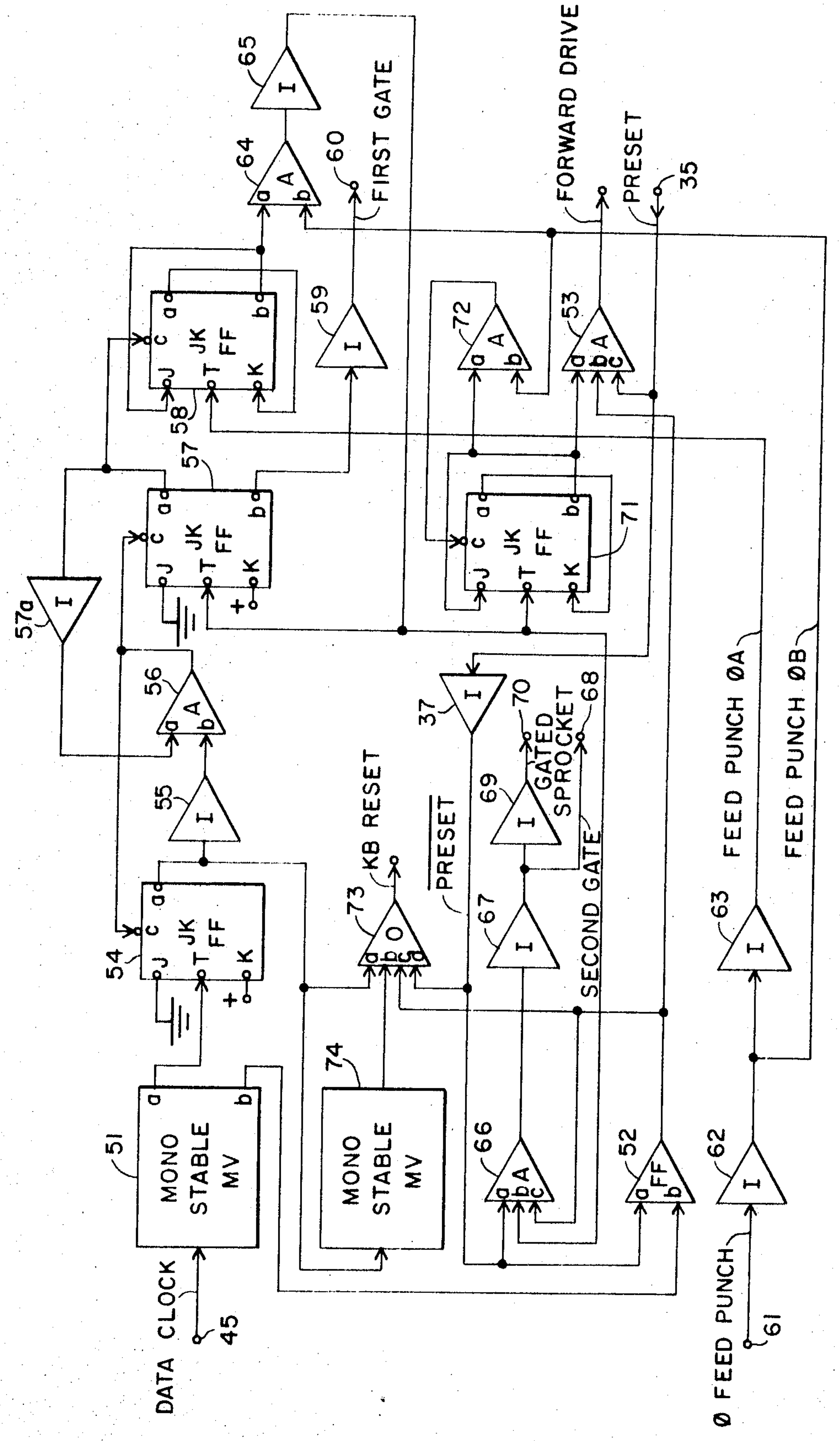
FIG. 3 is a schematic diagram of the sync-logic unit of FIG. 1.

Before describing the overall system of FIG. 1 as well as the sync-logic unit of FIG. 3, it is believed that it would be helpful to state the basic logic of the JK flip-flop units included therein by means of the following table:

Synchronous Operation—Units 58, 71:

| Input Terminals J | Input Terminals K | Output Terminals (T Static) *a* | Output Terminals (T Static) *b* | Output Terminals (T High to Low) a | Output Terminals (T High to Low) b |
|---|---|---|---|---|---|
| L | X | L | H | L | H |
| H | X | L | H | H | L |
| X | L | H | L | H | L |
| X | H | H | L | L | H |

(X indicates that the condition of that input terminal has no effect on the next state of the flip-flop.)

Asynchronous Operation—Units 13, 54, 57:

| Input Terminal *c* | Output Terminals a | Output Terminals b |
|---|---|---|
| L | H | L |
| H | * | * |

(*When input terminal *c* is high, it has no control and the state of the flip-flop is in accordance with the preceding "Synchronous" table.)

There follows a general description of the overall code-signal generator system shown in FIG. 1, while the details and operation of the nonconventional component units of the system will be described hereinafter. When power is first applied to the system by closing of the switch 26, the single pulse generator 24 develops a 200 M-sec positive Preset pulse which appears at terminal 35 to preset all flip-flops in the sync-logic unit 23 and to preset all JK flip-flops 13 associated with the keyboard. When one of the keys 10 is depressed, it develops a positive pulse signal, Curve A of FIG. 5, of an indefinite duration, as indicated. This signal is applied to the inverter 12 and the resulting negative pulse of the same duration is applied to the trigger terminal T of the JK flip-flop 13. This causes the unit 13 to change state, developing a positive pulse having a minumum duration of approximately 1 μsec, Curve B, FIG. 5, on the *b* terminal which is applied via inverter **13*a* to one of the 64 lines 11 comprising the input lines of the code-generator unit 14**.

As described hereinafter, the unit 14 develops an eight-level code representative of the key 10 which was depressed and this appears as a group of simultaneous negative pulses on data lines 15, each pulse of 85 n-sec duration, Curve C, FIG. 5. Unit 14 also generates a positive Data Clock pulse of 50 n-sec duration, Curve D, FIG. 5, which is initiated about 35 n-sec after the leading edge of the first data pulse on any of the data lines 15 so that the trailing edges of these two pulses substantially coincide in time.

Figure 5:
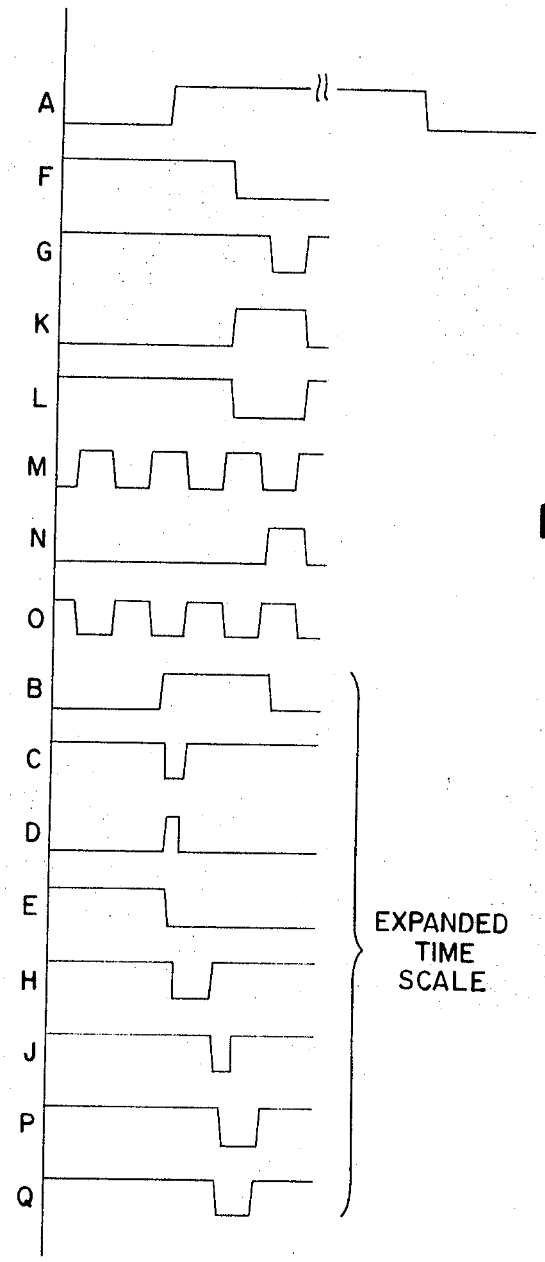

The simultaneous output data pulses generated by the unit 14 and appearing on the data lines 15 are initially applied to a first shift register 16 and, upon the appearance of a Data Clock pulse, Curve D of FIG. 5, the information stored in the first shift register 16 appears as logic levels of duration equal to the interval between two successive key depressions. Each of these logic levels, represented by Curve E of FIG. 5, is transferred via the data lines 17 to a second shift register 18.

The sync-logic unit develops a First Gate signal which is applied via lead 30 to the register 18, causing it to transfer from its input to its output a group of logic levels each represented by Curve F of FIG. 5 and store then in the register. The sync-logic unit 23 also develops a Second Gate signal which is applied via lead 31 to AND gates 20 to develop on their output lines 21 and apply to the punch drive unit 22 a group of pulses each of 10 m-sec duration and represented by Curve G of FIG. 5. The punch drive unit 22 utilizes the coded pulses appearing on the data output lines 21 to punch a tape with the coded representation of the particular key 10 which has been depressed.

The punch drive unit 22 also includes a sync or phase-signal generator which feeds back a signal φ Feed Punch over the lead 33 to the sync-logic unit which, as previously described, controls the transfer of data through the first and second shift registers and the AND gates in accordance with the cycle of operation of the punch drive unit 22 to make certain that data, representing a particular key, has been utilized before transfer of additional data from the second shift register 18 to the AND gates 20.

As indicated, the sync-logic unit 23 develops a positive KB Reset signal of 400 n-sec duration which is translated over a lead 28 and an inverter 29 to the terminal *c* of each JK unit 13, the effect of which is to block all of the JK units and to prevent transfer of key-generated signals until the data from the second preceding depressed key has been utilized and the data from the preceding depressed key has been transferred from the first register 16 to the second register 18. The sequence and timing of these successive shifts of data through the system will be explained in connection with the operation of the sync-logic unit 23.

CODE GENERATOR

FIG. 2 represents one type of code generator suitable for use as the unit 14 of FIG. 1 and is shown as a code generator of the conventional diode matrix type comprising 64 input lines 11 connected in various permutations with eight output data lines 15 by way of diodes 40. It is well understood that, by the use of such a diode matrix, depression of any of the keys 10 (FIG. 1) is effective to develop on the output data lines 15 an unique group of simultaneous pulses each having a duration represented by Curve C, FIG. 5. Each such group of pulses comprises an eight-bit code representation of the particular key depressed. However, the initiation and duration of the key-generated pulses is somewhat indeterminate so that these pulses must be accurately timed and otherwise processed before they are applied to the tape punch in unit 22. This is accomplished under the control of the sync-logic unit 23 described hereinafter. The unit 23 also includes an electrical interlock to prevent interaction of the code pulses representative of two keys if they should be depressed substantially simultaneously.

The code-signal generator further includes circuitry for developing a Data Clock signal, Curve D of FIG. 5, which, as mentioned above, is a positive pulse having a duration of 50 n-sec and commencing about 35 n-sec after the occurrence of the first data pulse, Curve C of FIG. 5. This circuitry includes a series of isolating diodes 41 individually connecting the several data lines 15 to one terminal *a* of an OR gate 42, the other terminal *b* of which is connected to terminal 43, to which is applied a signal developed by a switch 10 of the keyboard (FIG. 1) when the operator wishes to advance the tape through the punch even when no data is being transmitted. The output of OR gate 42 is applied to the input of a monostable multivibrator delay unit 44 which is effective to develop the Data Clock pulses as described and deliver them to the terminal 45. In this way, a Data Clock pulse is developed whenever it is desired to advance the tape feed through the punch with or without the transmission of data.

SYNC-LOGIC UNIT AND OVERALL SYSTEM

The sync-logic unit 23 of FIG. 1 is shown in FIG. 3 in which, for clarity, the input and output lines are identified by the same legends as in FIG. 1. The interconnections between the components of the logic circuitry and the other components of the system are sufficiently complex that it is believed the system can be described most clearly in terms of its overall operation.

The Data Clock pulse at terminal 45, Curve D of FIG. 5, is applied to a monostable multivibrator 51 to start the synchronizing of the input data with the operating cycle of the punch in the unit 22. When so triggered, the output terminal *b* of unit 51 develops a negative pulse of 250 n-sec duration, Curve H of FIG. 5, and applies it to terminal *b* of flip-flop 52. At the same time, there is applied to terminal *a* of flip-flop 52 a Preset negative pulse signal from terminal 35 through inverter 37 which occurs during the first 30 m-sec of the Preset signal which, as described above, is of approximately 200 m-sec duration after power is first applied to the system. If, during its operation, the punch has been manually set by the operator to run in the reverse mode, for example for deletion of a character of other correction, the negative pulse from terminal *b* of multivibrator 51 sets the flip-flop 52 back to the forward mode.

At the same time, output terminal *a* of multivibrator unit 51 applies a positive 250 n-sec pulse (Curve H of FIG. 5 inverted) to terminal T of a JK unit 54 to start the synchronizing cycle. The trailing edge of the 250 n-sec pulse causes the output terminal *a* of JK unit 54 to go low and this negative pulse of about 100 n-sec duration, Curve J, FIG. 5, is applied to inverter 55, the output of which is a positive pulse applied to terminal *b* of AND gate 56. If the punch is active, the terminal *a* of gate 56 is low, as described hereinafter, so that there is no output from the AND gate 56 and the control signal stops until the end of the punch cycle.

If there were data in the first register 16, the leading edge of the positive Data Clock pulse, Curve D, FIG. 5, would shift such data to the register output and to the data lines 17 connected to the input of the second register 18 to be further processed, as described hereinafter. However, assuming that no data was presented to the system in the previous operating cycle of the punch, which is assumed to be about 20 m-sec, the first register 16 contains no data. The input terminal *a* of AND gate 56 is high, due to the fact that the succeeding JK flip-flop 57 is in its initial condition so that its output terminal *a* is low and this negative pulse signal passes through an inverter **57*a***, the output signal of which is a positive pulse which is applied to input terminal *a* of gate 56. Since both terminals *a* and *b* of AND gate 56 are high, its output goes low and resets the JK unit 54 back to its initial state in which the signal at output terminal *a* is high. At the same time, the low-signal output of gate 56 is also applied to terminal *c* of a JK unit 57 which is set so that its output terminal *a* is high and terminal *b* low. The high-signal pulse at terminal *a* of unit 57 of 20 m-sec maximum duration (Curve K, FIG. 5) is applied to terminal *c* of a following JK unit 58, while the low-signal pulse at terminal *b* of unit 57 of 20 m-sec maximum duration (Curve L, FIG. 5) is applied to an inverter 59 which develops and applies to a terminal 60 a First Gate signal. Referring to FIG. 1, this is the First Gate signal which is effective to transfer the data from the input to the output of the second register 18 and to data lines 19 connected to AND gates 20.

Referring to Curves A–J of FIG. 5, it is seen that this First Gate signal occurs approximately 550 n-sec after the depression of the key 10 which initiated this portion of the cycle of operation of the sync-logic unit 23. It has been found that this time is well within the minimum time separation of about 1 μsec of pulses generated by two keys apparently depressed simultaneously. Thus, data stored in register 16 in response to depression of a first key is transferred to the second register 18 before data from depression of a second key can reach the register 16.

The sync-logic unit of FIG. 3 further receives a φ Feed Punch signal from unit 22 which is applied at terminal 61 and passes through inverters 62 and 63 to form a 10 m-sec duration positive pulse, Feed Punch φA signal (Curve M, FIG. 5), which is applied to terminal T of JK unit 58. As stated above, terminal *c* of unit 58 receives a positive pulse from terminal *a* of unit 57. Hence the trailing edge of the φA signal causes unit 58 to change state so that its output terminal *b* develops a 10 m-sec positive pulse (Curve N, FIG. 5). This signal is applied to terminal *a* of AND gate 64. The Feed Punch φB signal, a positive pulse of 10 m-sec duration (Curve O, FIG. 5), is concurrently applied to input terminal *b* of AND gate 64 so that its output goes low and this negative pulse is applied to inverter 65, the output of which goes high and this positive pulse is applied to terminal *b* of AND gate 66. It is assumed that the positive Preset signal at terminal 35 is no longer present so that the $\overline{\text{Preset}}$ signal is high and the input terminal *a* of AND gate 66 is also high. As described above, the input terminal *c* of gate 66, connected to the output of flip-flop 52, is also high so that the output of AND gate 66 is low. This negative pulse signal is applied to inverter 67, the output of which is high, and this positive pulse signal is the Second Gate signal applied via terminal 68 to AND gates 20 and releases the data in those gates to lines 21 for application to the punch-drive unit 22, the operation of which is described hereinafter. Note that the release of data from AND gates 20 cannot occur until the trailing edge of the φB signal, which coincides with the completion of the 20 m-sec cycle of operation of the punch during which the data from the previously depressed key will have been utilized.

The Second Gate signal is also applied to inverter 69, the output of which, the Gated Sprocket signal, appears at terminal 70.

On the trailing edge of the positive φB signal, the output of AND gate 64 goes high. This positive pulse is inverted in inverter 65 whose output goes low and this negative pulse signal is applied to terminal T of JK unit 57 to reset it so that its output terminal *a* goes low and its terminal *b* goes high. The negative pulse from terminal *a* of JK unit 57 is applied to terminal *c* of JK unit 58 which resets it so that its output terminal *a* is again high and its output terminal *b* low. At the same time, the positive signal form terminal *b* of JK unit 57 is applied to inverter 59 whose output goes low to develop the First Gate signal which, as shown in FIG. 1, is applied to the second shift register to transfer the data therein to data lines 19 and to AND gates 20.

Also on the trailing edge of the φB signal, the negative pulse signal output of inverter 65 is applied to terminal T of a JK unit 71 which causes its output terminal *b* to go high and this positive pulse signal is applied to terminal *a* of AND gate 53. Terminal *b* of this gate is also high, due to the output from flip-flop 52 as previously described, and its terminal *c* is also high due to the absence of the $\overline{\text{Preset}}$ signal. The output of AND gate 53 then goes low to provide a negative signal to the Forward-Drive circuit of the punch unit 22 (FIG. 1). As described hereinafter, this is effective to advance the tape through the punch for punching.

The positive pulse signal from terminal *b* of JK unit 71 is also applied to terminal *a* of an AND gate 72 while the positive φB signal is applied to terminal *b* of this AND gate so that the output of AND gate 72 goes low. This negative pulse signal is applied to terminal *c* of the JK unit 71 to reset it so that its output terminal *a* goes high and its terminal *b* low. The latter negative pulse signal is applied to terminal *a* of AND gate 53 to cut off the forward drive after the punch has advanced by one sprocket.

Going back to JK unit 57, its output terminal *a* has gone low on the trailing edge of the $\phi$B signal, as described above, so that the input to terminal *a* of AND gate 56 is now high, its output goes low, and this signal is applied to terminal *c* of JK unit 54 so that its output terminal *a* goes high.

When the signal at terminal *a* of JK unit 54 goes high as just described, this is applied to terminal *a* of an OR gate 73, the output of which constitutes a KB Reset signal which, as shown in FIG. 1, is applied to all of the JK units 13 through inverters 29 to hold all JK units 13 in a set condition and thus block any active signals from the code generator 14. This KB Reset signal is represented by Curve P of FIG. 5. If the punch is not active so that the $\phi$A and $\phi$B signals are not present, the KB Reset signal persists only for the total transit time of the signal through the JK unit 54, the OR gate 73, and inverters 29. However, the negative pulse signal from terminal *a* of JK unit 54 is applied to a second monostable multivibrator 74 which develops, at its output terminal, a negative pulse of 250 n-sec, Curve Q, FIG. 5, which is applied to terminal *b* of OR gate 73 which extends the duration of the KB Reset signal and blocks the JK units 13 for approximately 300 n-sec.

If, under the conditions just described, the punch is active, the presence of another Data Clock pulse causes the signal at the output terminal *a* of JK unit 54 to go low and remain low until the punch is inactive. This negative pulse signal, applied to the OR gate 73, extends the KB Reset signal to keep the keyboard "locked" until terminal *c* of JK unit 54 goes low, resetting JK unit 54 so that the signal at its output terminal *a* goes high again, as described above.

PUNCH DRIVE AND SYNC-SIGNAL GENERATOR

Figure 4:
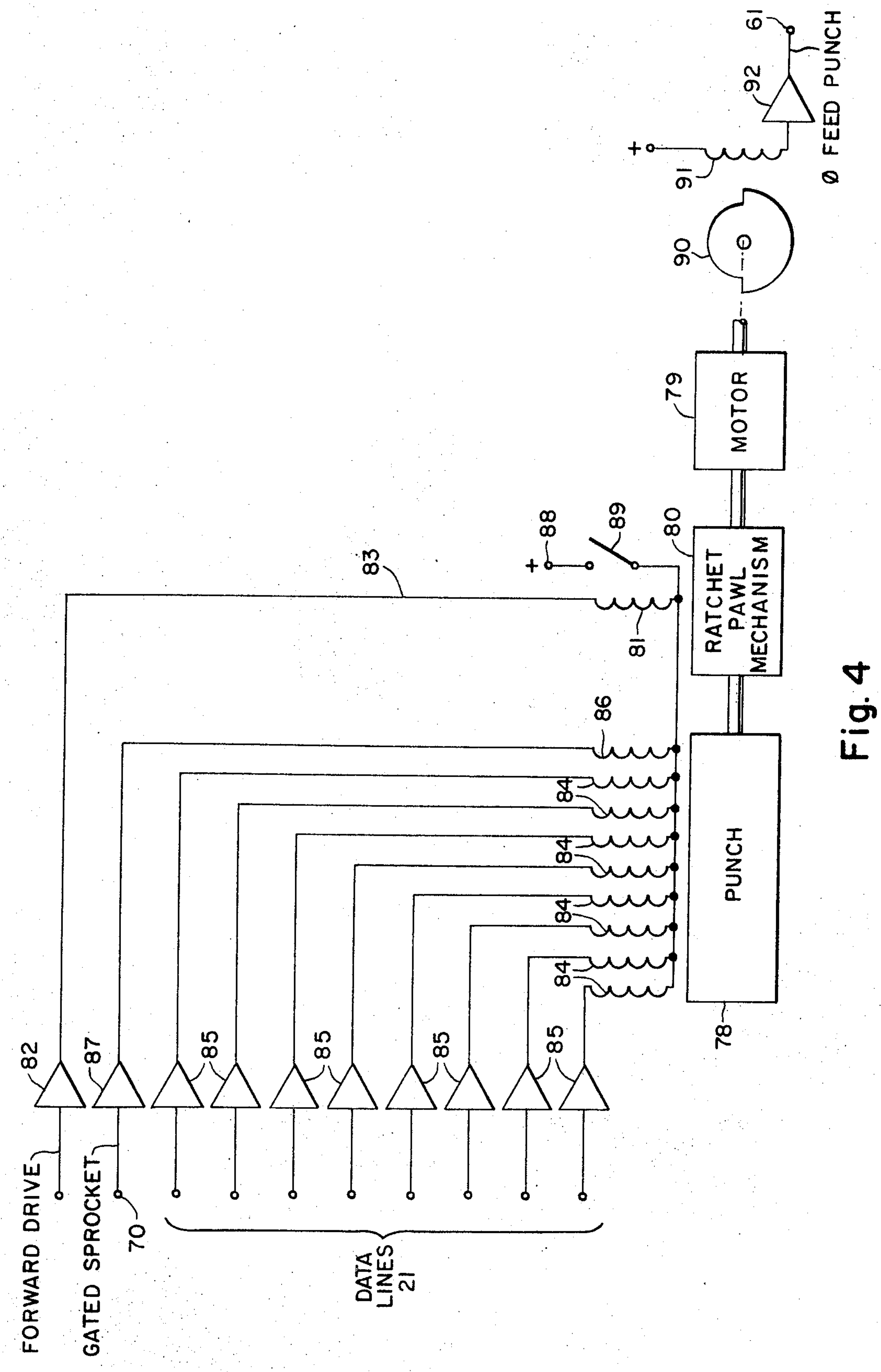
FIG. 4 is a schematic diagram of the punch drive and sync-signal generator unit of FIG. 1, while FIG. 5 comprises a series of waveforms representative of various signals generated by, and utilized in, the apparatus of FIGS. 1, 3, and 4.

The punch drive and sync-signal generator is shown schematically in FIG. 4. This unit comprises a conventional punch 78 driven by a continuously running motor 79 through a ratchet and pawl mechanism 80 which may be of conventional construction and which is controlled by a coil 81 to which is applied the Forward-Drive signal via amplifier 82 and lead 83. The punch 78 is provided through and with eight punch-actuating coils 84 selectively energized from the data lines 21 through amplifiers 85. The punch 78 is also provided with a sprocket hole punch actuated by a coil 86 connected to the Gated Sprocket terminal 70 through an amplifier 87. The coil 86 is effective, upon energization, to punch sprocket holes in the tape to enable it to be drawn through the punch. The coils 81, 84, and 86 are energized from a suitable source having a terminal 88 through a manual switch 89.

The punch drive unit further comprises a two-level disc or cam 90 of paramagnetic material driven by motor 79. Associated with the cam 90 is a pickup winding 91 which generates a Feed-Punch signal synchronous with rotation of the punch 78 and motor 79 and having a period, for example, of about 20 m-sec. This signal is applied via amplifier 92 to terminal 61 of the sync-logic unit of FIG. 3, as indicated, and, upon passage through the inverters 62 and 63, develops the $\phi$A and $\phi$B Feed-Punch signals (Curves M and O, FIG. 5), each of which comprises high and low portions each of approximately 10 m-sec duration but displaced in time by 10 m-sec.

It is believed that the operation of the punch drive unit of FIG. 4 will be apparent from the foregoing description. The punch 78 is actuated in a conventional manner from the code signals appearing on the data lines 21. The Forward-Drive signal applied to coil 81 via amplifier 82 and lead 83 energizes coil 81, causing the pawl of mechanism 80 to engage its associated ratchet wheel to advance the tape through the punch a distance corresponding to one sprocket tooth. The sprocket coil 86, under control of the Gated Sprocket signal, is effective to punch conventional sprocket holes in the tape during the punch half of the cycle after data holes have been punched in the tape. The cam 90 driven by motor 79, in association with the pickup winding 91, generates the $\phi$ Feed-Punch signal, as described.

From the foregoing description, it is apparent that in an electrical code-signal generating system in accordance with the invention, two keys can be depressed up to 1 $\mu$sec apart and these signals will be punched separately without mutual interference. Experience has shown that this is well within the actual separation of the signals developed by two keys apparently depressed simultaneously. At the same time, signals from a third key cannot be entered until completion of the punch cycle of approximately 20 m-sec. In this way, it is not necessary for an operator to wait until completion of a punch cycle in response to depression of a first key to depress a second key but he can depress the first and second keys essentially simultaneously and depress a third key when the punch has utilized the signals from the first key, etc. Signals from one key are always stored in the system, waiting for instantaneous use by the punch when it has completed its previous cycle. In this way, the speed of the system is materially increased.

In addition, the system is readily adapted for use with devices requiring a different information input language by merely replacing the code generator unit 14. In Applicant's system, this unit performs no function other than that of a signal encoder and does not include any complex synchronizing circuit, interlock circuit, or other control circuits frequently found in the code generator.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An electrical code-signal generator system for operation from a keyboard having a plurality of signal-generating keys comprising:
   - a plurality of input lines for individually receiving signals from the keys;
   - a normally enabled gate in each of said input lines;
   - a code generator including a plurality of input circuits individually coupled to said gates, having a first plurality of data output lines, and effective to develop character-representative encoded signal pulses on said lines;
   - a first shift register coupled to said data output lines;
   - a second shift register coupled to said first shift register and having a second plurality of data output lines;
   - a cyclically operating utilization device coupled to said second data output lines and effective to develop a cyclical signal representative of and isochronous with its operating cycle;
   - a source of clock pulses;
   - means responsive to said clock pulses for transferring data from said code generator to the output of said first register and thence to the input of said second register;
   - and means coupled to said source and to said utilization device and jointly responsive to said clock pulses and to said cyclical signal for developing a control signal and applying it to all of said gates to inhibit the same for a predetermined minimum interval after actuation of a given key and until any data in said second shift register has been utilized by said utilization device.

2. An electrical code-signal generator system for operation from a keyboard having a plurality of signal-generating keys comprising:
   - a plurality of input lines for individually receiving signals from the keys;
   - a normally enabled gate in each of said input lines;
   - a code generator including a plurality of input circuits individually coupled to said gates, having a first plurality of data output lines, and effective to develop character-representative encoded signal pulses on said lines;
   - a first shift register coupled to said data output lines;
   - a second shift register coupled to said first shift register and having a second plurality of data output lines;

a plurality of gates individually included in said second data lines;

a cyclically operating utilization device coupled to said second data output lines and effective to develop a cyclical signal representative of and isochronous with its operating cycle;

means responsive to said cyclical signal for enabling said second plurality of gates to transfer data from said second register to said utilization device;

a source of clock pulses;

means responsive to said clock pulses for transferring data from said code generator to the output of said first register and thence to the input of said second register;

and means coupled to said source and to said utilization device and jointly responsive to said clock pulses and to said cyclical signal for developing a control signal and applying it to all of said gates to inhibit the same for a predetermined minimum interval after actuation of a given key and until any data in said second shift register has been utilized by said utilization device.

3. An electrical code-signal generator system for operation from a keyboard having a plurality of signal-generating keys comprising:

a plurality of input lines for individually receiving signals from the keys;

a normally enabled gate in each of said input lines;

a code generator including a plurality of input circuits individually coupled to said gates, having a first plurality of data output lines, and effective to develop character-representative encoded signal pulses on said lines;

a first shift register coupled to said data output lines;

a second shift register coupled to said first shift register and having a second plurality of data output lines;

a cyclically operating punch and a connected driving motor coupled to said second data output lines and effective to develop a cyclical signal representative of and isochronous with its operating cycle;

a source of clock pulses;

means responsive to said clock pulses for transferring data from said code generator to the output of said first register and thence to the input of said second register;

means responsive to said clock pulses and to said cyclical signal for advancing tape and feeding data from said second data lines to said punch;

and means coupled to said source and to said punch and driving motor and jointly responsive to said clock pulses and to said cyclical signal for developing a control signal and applying it to all of said gates to inhibit the same for a predetermined minimum interval after actuation of a given key and until any data in said second shift register has been utilized by said punch and driving motor.

4. An electrical code-signal generator system for operation from a keyboard having a plurality of signal-generating keys comprising:

a plurality of input lines for individually receiving signals from the keys;

a normally enabled gate in each of said input lines;

a code generator including a plurality of input circuits individually coupled to said gates, having a first plurality of data output lines, and effective to develop character-representative encoded signal pulses on said lines;

a first shift register coupled to said data output lines;

a second shift register coupled to said first shift register and having a second plurality of data output lines;

a cyclically operating utilization device coupled to said second data output lines and effective to develop a cyclical signal representative of and isochronous with its operating cycle;

means responsive to the first signal on said first data output lines for developing a pulse commencing a predetermined interval thereafter comprising a source of clock pulses;

means responsive to said clock pulses for transferring data from said code generator to the output of said first register and thence to the input of said second register;

and means coupled to said source and to said utilization device and jointly responsive to said clock pulses and to said cyclical signal for developing a control signal and applying it to all of said gates to inhibit the same for a predetermined minimum interval after actuation of a given key and until any data in said second shift register has been utilized by said utilization device.

5. An electrical code-signal generator system for operation from a keyboard having a plurality of signal-generating keys comprising:

a plurality of input lines for individually receiving signals from the keys;

a normally enabled gate in each of said input lines;

a code generator including a plurality of input circuits individually coupled to said gates, having a first plurality of data output lines, and effective to develop character-representative encoded signal pulses on said lines;

a first shift register coupled to said data output lines;

a second shift register coupled to said first shift register and having a second plurality of data output lines;

a cyclically operating utilization device coupled to said second data output lines and effective to develop a cyclical signal representative of and isochronous with its operating cycle;

a source of clock pulses;

means responsive to said clock pulses for transferring data from said code generator to the output of said first register and thence to the input of said second register;

and means coupled to said source and to said utilization device and jointly responsive to said clock pulses and to said cyclical signal for developing a control signal and applying it to all of said gates to inhibit the same for a predetermined minimum interval of the order of 1 $\mu$sec after actuation of a given key and until any data in said second shift register has been utilized by said utilization device.

* * * * *